UNITED STATES PATENT OFFICE.

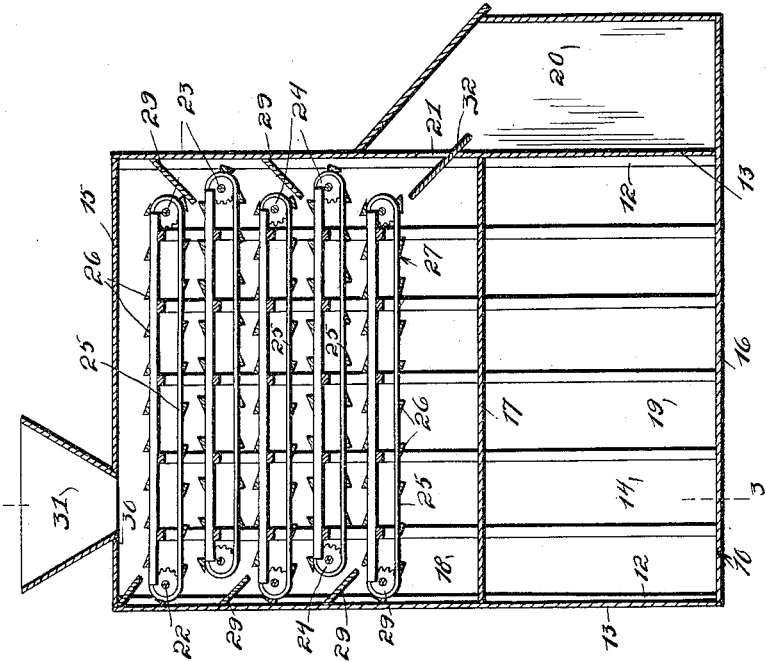

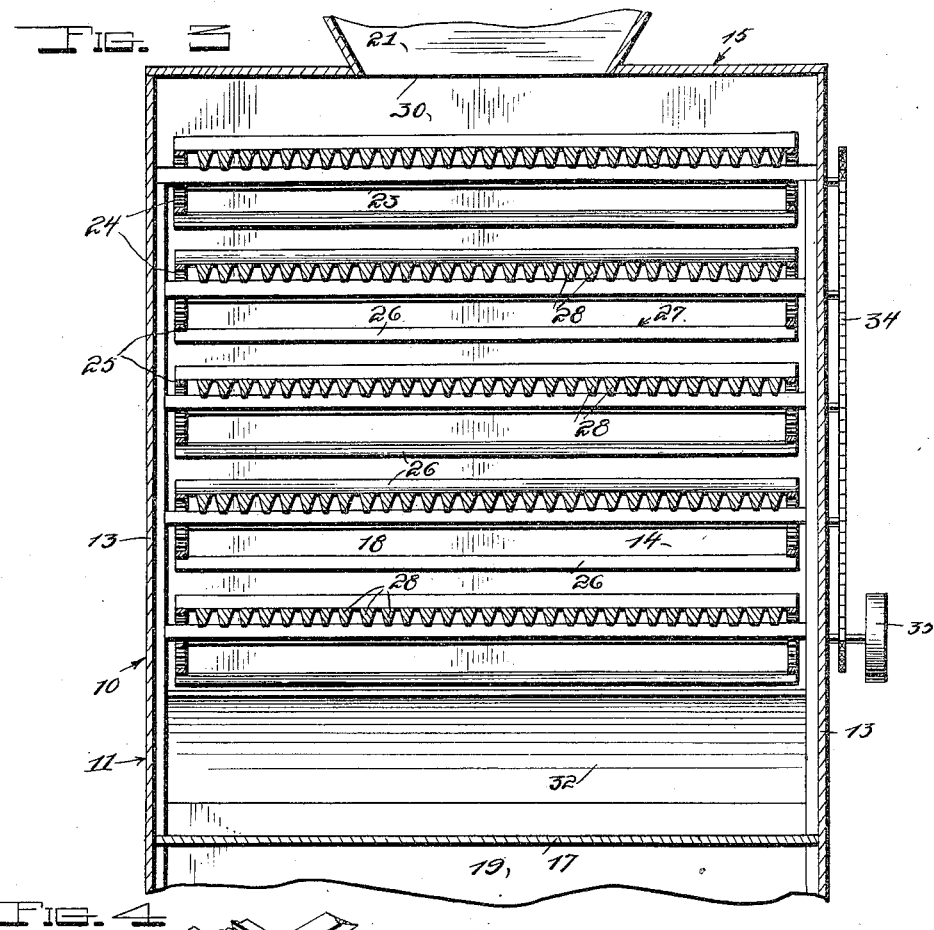
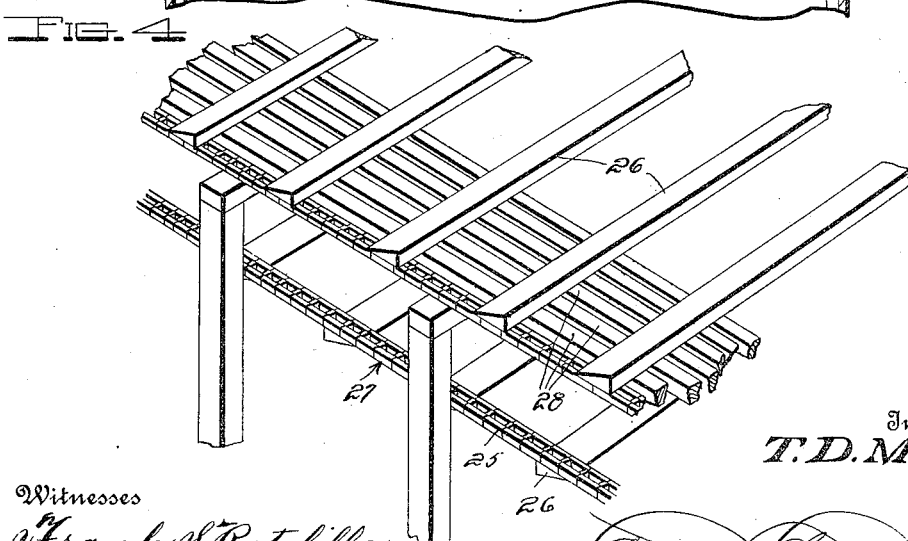

THOMAS D. MORGAN, OF ROGERS, ARKANSAS.

FRUIT-EVAPORATOR.

1,064,925.

Specification of Letters Patent.   Patented June 17, 1913.

Application filed April 18, 1912.   Serial No. 691,553.

*To all whom it may concern:*

Be it known that I, THOMAS D. MORGAN, a citizen of the United States, residing at Rogers, in the county of Benton, State of Arkansas, have invented certain new and useful Improvements in Fruit-Evaporators; and I do hereby declare the following to be a full, clear, and exact description of the invention, such as will enable others skilled in the art to which it appertains to make and use the same.

This invention relates to new and useful improvements in fruit evaporators.

An object of this invention is the provision of a device of this character which comprises a plurality of endless aprons adapted to move in opposite directions, and convey the fruit through a compartment disposed above the heating compartment and from the said apron into a bin in which the fruit is temporarily stored.

Another object of this invention is the provision of a means for preventing the fruit from passing through the aprons and falling upon the top of the heating compartment.

Still another object of this invention is the provision of means for operating the shafts which supports the aprons for the purpose of driving the same in opposite directions.

A further object of this invention is to improve and simplify devices of this character, rendering them comparatively simple and inexpensive to manufacture, reliable and efficient in use and readily operated.

With the above and other objects in view, this invention resides in the novel features of construction, formations, combinations and arrangements of parts to be hereinafter more fully described, claimed and illustrated in the accompanying drawings, in which:

Figure 1 is a side elevation of my invention. Fig. 2 is a longitudinal sectional view taken therethrough. Fig. 3 is a transverse sectional view taken on the line 3—3 of Fig. 2, and Fig. 4 is a detailed perspective view illustrating a portion of one of the conveyer aprons and the means for preventing the fruit from falling therethrough.

Referring to the accompanying drawings by similar characters of reference, the numeral 10 designates generally my fruit evaporator which comprises a housing 11 consisting of opposite corner posts 12 connected by the usual side and end walls 13 and 14 which are in turn connected at their upper and lower edges by a top 15 and a bottom 16. A horizontal partition 17 is disposed within the housing 10 and divides the same into an upper and a lower compartment 18 and 19.

A plurality of shafts 22 and 23 are journaled transversely of the compartment 18 in staggered relation to each other adjacent the opposite ends thereof, and have keyed to the opposite ends sprocket wheels 24 over which are extended endless chains 25, which carry secured thereto a plurality of transversely extending slats 26 of any desired construction, and which constitute the aprons 27.

A plurality of slats are secured longitudinally of the aprons below the upper laps thereof as designated by the numeral 28 and are spaced apart a sufficient distance to permit the necessary circulation of air therethrough but to prevent the contents of the apron from falling through the slats 27 and upon the partition 17.

It will be noted that owing to the position of the shafts 22 and 23, the opposite ends of the apron 27 are extended beyond each other at opposite ends of the housing 10 which causes the contents of one apron upon the movement thereof to be dropped upon the apron disposed therebelow through the assistance of the baffle plates 29 which prevents the contents from passing over the ends of the aprons down to the partition 17.

The top 15 of the housing 10 is formed at one end with a longitudinally extending slot 30 from which extends a hopper 31 through which the fruit is passed in its green state to the upper of the conveyers 27. A baffle plate 32 is secured to the upper edge of the opening 21 and extends below the adjacent end of the lower apron 27 thereby causing the contents thereof to be deflected into the bin 20. The shafts 23 are extended beyond the adjacent side wall 19 at one side of the housing 10 and have keyed thereon sprocket wheels 33. A chain belt 34 passes over the upper and lower sprocket wheels 33 and alternately over the opposite sides of the remainder of the sprocket wheels thereby causing the shafts 23 to to be rotated in opposite directions when power is applied to the drive pulley 35 which is keyed to the lower of the said shafts 23.

From the foregoing disclosures it will be readily seen that when the green fruit is fed through the hopper 31 upon the upper conveyer that the same will be alternately deposited upon the conveyer aprons to the lower one from which it will be deflected in its evaporated condition by means of the baffle plate 32 into the bin 20, from which it can be removed as desired. It should be understood in this connection that various minor changes in the details of construction can be resorted to within the scope of the appended claim without departing from or sacrificing any of the advantages of the invention.

From the foregoing disclosures taken in connection with the accompanying drawings it will be manifest that a device of the nature described is provided which will fulfil all of the necessary requirements of such a device.

Having thus fully described this invention what I claim as new and desire to protect by Letters Patent, is:—

The combination in an evaporator such as described of a housing, a partition disposed within said housing dividing the same into upper and lower compartments, shafts journaled in staggered relation in the opposite ends of the upper compartment, sprocket wheels keyed to said shafts, conveyer chains passing over said sprocket wheels, slats connecting the conveyer chains and extending transversely of the compartment, longitudinal slats disposed beneath the upper laps of the conveyer chains for preventing the displacement of the fruit from the conveyer chains and transverse slats which constitute aprons, baffle plates secured to the opposite ends of the upper compartment for deflecting the fruit upon the conveyer aprons in alternate succession, a bin attached to one end of the lower compartment and lower end of the upper compartment, said bin communicating with the upper compartment through a longitudinal opening, a baffle plate secured to the lower edge of the opening, and having its opposite end disposed beneath the lower conveyer apron, a sprocket wheel keyed to the shaft at one end of the housing, a chain passing over the upper and lower of these last mentioned sprocket wheels and engaging the alternate sides of the remaining sprocket wheels and means for rotating one of said shafts, and operating the aprons in opposite directions.

In testimony whereof, I affix my signature, in presence of two witnesses.

THOMAS D. MORGAN.

Witnesses:
   G. M. N. PARKER,
   E. E. PICKENS.

---

Copies of this patent may be obtained for five cents each, by addressing the "Commissioner of Patents, Washington, D. C."